United States Patent [19] [11] 4,435,564
House [45] Mar. 6, 1984

[54] COMPOSITIONS AND PROCESSES FOR USING HYDROXYETHYL CELLULOSE IN HEAVY BRINES

[75] Inventor: Roy F. House, Houston, Tex.

[73] Assignee: Venture Innovations, Inc., Lafayette, La.

[21] Appl. No.: 385,572

[22] Filed: Jun. 7, 1982

[51] Int. Cl.³ .................. C08B 11/20; C09K 3/00; C09K 7/00
[52] U.S. Cl. .................. 536/87; 252/8.5 A; 252/8.5 C; 252/8.5 P; 252/8.5 LC; 252/8.55 R; 536/96
[58] Field of Search .......... 536/87, 96; 252/426, 252/8.55 R, 8.5 C, 8.5 A, 8.5 P, 8.5 LC; 564/498

[56] References Cited

U.S. PATENT DOCUMENTS

| | | | |
|---|---|---|---|
| 2,173,470 | 9/1939 | Broderick | 536/96 |
| 2,181,264 | 11/1939 | Dreyfus | 536/96 |
| 2,742,504 | 4/1956 | Grail | 564/498 |
| 4,073,726 | 2/1978 | Okamoto et al. | 564/498 |
| 4,080,162 | 3/1978 | Renold | 564/511 |
| 4,120,979 | 10/1978 | Schwarzmann et al. | 564/511 |
| 4,250,044 | 2/1981 | Hinkel | 252/8.55 R |
| 4,290,899 | 9/1981 | Malone et al. | 252/8.55 R |
| 4,293,682 | 10/1981 | Kluger et al. | 564/512 |
| 4,304,677 | 12/1981 | Stauffer et al. | 252/8.55 R |
| 4,336,145 | 6/1982 | Briscoe | 252/8.55 R |
| 4,336,146 | 6/1982 | Majewicz et al. | 252/8.55 R |

*Primary Examiner*—Ronald W. Griffin
*Attorney, Agent, or Firm*—Roy F. House

[57] ABSTRACT

Processes are disclosed for activating hydroxyethyl cellulose (HEC) such that the HEC will disperse and hydrate in compatible heavy brines having a density greater than about 13.5 pounds per gallon containing one or more salts selected from the group consisting of calcium chloride, calcium bromide, zinc chloride, and zinc bromide, at ambient temperatures such that the HEC will be at least 80% hydrated within one hour.

The activation process comprises admixing the HEC with an organic liquid which has no appreciable swelling effect on the HEC and an amine activator.

The invention also provides activated HEC compositions and a process of increasing the viscosity of a heavy brine utilizing these compositions.

19 Claims, No Drawings

COMPOSITIONS AND PROCESSES FOR USING HYDROXYETHYL CELLULOSE IN HEAVY BRINES

In the petroleum industry, the importance of utilizing clear workover and completion fluids to minimize formation damage is widely recognized. In recent years, the use of clear, solids free fluids has gained stature in the industry. Experience has shown that such clear fluids increase well productivity as compared to solids containing fluids. Heavy clear fluids containing various water soluble salts have been proposed. The density and the crystallization temperature of such fluids can be controlled by adjusting the composition of the fluid. Table A lists the wide variation in densities and crystallization temperature which can be obtained.

TABLE A

| Salts in Brine | Density Range lb/gal | Crystallization Temperature Range, °F. |
|---|---|---|
| $CaCl_2/CaBr_2$ | 11.1–15.1 | −12 to 68 |
| $CaBr_2$ | 14.2–15.0 | 15 to 65 |
| $CaBr_2/ZnBr_2$ | 14.3–19.2 | −40 to 23 |
| $CaCl_2/CaBr_2/ZnBr_2$ | 15.0–19.1 | −8 to 64 |

Clear brines having a density greater than 11.1 per gallon (ppg) are generally formulated to contain either calcium chloride, calcium bromide, zinc bromide, or mixtures of these salts. Because these salts are expensive, the present industry practice is to provide the most inexpensive brine of the required density and maximum desired crystallization temperature by first minimizing the concentration of zinc bromide and secondly, maximizing the concentration of calcium chloride in the fluid.

Often it is necessary to control the loss of fluid from the heavy brine into the subterranean formation in which the brine is used. This is generally accomplished by suspending in the brine an oil-soluble or acid-soluble bridging material and/or increasing the viscosity of the brine with a water soluble polymer.

Many investigations have shown that hydroxyethyl cellulose (HEC) polymers have the least damaging effect on subterranean formations when compared with other commercially available water soluble polymers, particularly after the polymers are degraded before production occurs. It has been variously reported that HEC will viscosify heavy clear brines containing calcium bromide and zinc bromide; however, it has also been reported that HEC is not satisfactory for zinc bromide-calcium bromide brines.

Dispersion of HEC in many of the dense clear brines is a problem since the hydration rate of HEC is very slow. Agitation of the brine must be maintained in order to prevent the HEC from hydrating as a "glob" or mass of hydrated particles. Moreover, in certain dense brines the HEC will hydrate only after elevating the temperature of the brine, and in still other brines, HEC will not hydrate under any conditions of use.

Concentrated suspensions of HEC in inert organic liquids which do not appreciably swell the HEC have recently been introduced to the drilling industry. Such suspensions generally contain: a high concentration of HEC; an organic liquid suspending medium such as a hydrocarbon, a relatively high boiling alcohol, and the like; a suspending agent such as an organophilic clay; and a surfactant for enhancing the release of the HEC into an aqueous liquid. Liquid HEC suspensions containing a pH stabilizer are available from NL Baroid/NL Industries, Inc. (LIQUI-VIS) and American Brine and Rental Equipment, Inc. (AMTROL). A formula and method for preparing a liquid HEC suspension published by Union Carbide Corp. consists of 1.39% BENTONE 34 organophilic clay, 0.28% methanol, 42.5% HEC, and 2% TERGITOL NP-10 surfactant in a hydrocarbon (diesel oil). Their literature states that patent applications have been applied for on this technology. A formula and method for preparing a liquid HEC suspension published by Hercules Incorporated consists of 37.0% HEC, 40.1% of an ethyl hexanol premix containing 1% KLUCEL H hydroxypropyl cellulose, 21.1% ISOPAR M oil, and 1.8% BRIJ SP 35 surfactant.

These types of suspensions of HEC when properly formulated enable HEC to be dispersed in aqueous liquids without the formation of partially hydrated agglomerates, the so called "fish-eyes". However, the HEC in these suspensions will not hydrate in and thus viscosify heavy brines any better than dry powder HEC.

It is evident that there is a need for compositions and methods for treating HEC such that the HEC will hydrate in and viscosify heavy brines containing calcium bromide and mixtures of calcium bromide with calcium chloride and/or zinc bromide at ambient temperatures.

It is an object of this invention to provide compositions for mixing with HEC which activate the HEC such that the HEC will hydrate in compatible heavy brines at ambient temperatures.

It is another object of this invention to provide compositions for mixing with HEC suspensions in inert organic liquids which activate the HEC such that the HEC will hydrate in compatible heavy brines at ambient temperatures.

Another object of this invention is to provide methods of activating HEC such that the HEC will hydrate in compatible heavy brines containing calcium chloride, calcium bromide, zinc chloride and/or bromide at ambient temperatures.

Still another object of this invention is to provide methods and compositions for increasing the viscosity of compatible heavy brines.

I have now found that HEC can be activated such that the HEC will be at least 80% hydrated within about one hour at ambient temperatures in compatible heavy brines by admixing the HEC with an amino compound containing at least two polar groups per molecule selected from the group consisting of primary amino, secondary amino, tertiary amino, hydroxyl, and mixtures thereof, having certain chemical characteristics as hereinafter disclosed, and a liquid organic diluent in an amount sufficient to keep the admixture a pourable liquid. The liquid organic diluent may be either water soluble or water insoluble. However, the chemical characteristics of the amino compounds which are effective in this invention differ depending on the water solubility of the liquid organic diluent, all as disclosed hereinafter.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

The invention comprises processes for activating HEC such that the HEC will be at least 80% hydrated within about one hour at ambient temperatures, such as 22° C., when added to compatible brines containing one or more salts selected from the group consisting of calcium chloride, calcium bromide, zinc bromide, and zinc chloride, having a density greater than about 13.5 lb./gal.

One such process comprises mixing HEC with a water soluble organic liquid (hereinafter sometimes referred to as WSOL) and thereafter mixing therewith an amino compound containing at least two polar groups per molecule selected from the group consisting of primary amino ($NH_2$), secondary amino (NH), tertiary amino (N), hydroxyl (OH), and mixtures thereof, having an atomic ratio of carbon atoms to the total number of primary amino groups plus hydroxyl groups not exceeding five, wherein the amount of the amino compound is at least 40% by weight, based on the HEC, and the amount of the WSOL is sufficient to keep the HEC admixture a pourable liquid.

Another process of my invention for so activating HEC comprises admixing the HEC with a solution of an amino compound in a WSOL in an amount sufficient to provide at least 40% of said amino compound, based on the weight of HEC, and from about 15% to about 30% by weight of HEC in the admixture, the amino compound containing at least two polar groups per molecule selected from the group consisting of primary amino, secondary amino, tertiary amino, hydroxyl, and mixtures thereof, having an atomic ratio of carbon atoms to the total number of primary amino plus hydroxyl groups not exceeding five.

Another process of my invention for so activating HEC comprises admixing the HEC with a water insoluble organic liquid (hereinafter sometimes referred to as WIOL) and thereafter mixing therewith an amino compound containing at least two polar groups per molecule selected from the group consisting of primary amino, secondary amino, tertiary amino, hydroxyl, and mixtures thereof, having an equivalent weight per amino group in the range from about 35 to about 150, an atomic ratio of carbon atoms to the total of said polar groups in the range from 1.5 to 5, and an atomic ratio of carbon atoms to the total number of primary amino and hydroxyl groups in the range from 2 to 5, wherein the amount of the amino compound is at least 40% by weight, based on the HEC, and the amount of the WIOL is sufficient to maintain the HEC admixture as a pourable liquid.

Still another process of this invention for so activating HEC which is in the suspension in an organic liquid comprises admixing with the suspension an amino compound containing at least two polar groups per molecule selected from the group consisting of primary amino, secondary amino, tertiary amino, hydroxyl, and mixtures thereof, having an atomic ratio of carbon atoms to the total number of primary amino plus hydroxyl groups not exceeding five, wherein the amount of the amino compound is at least 40% by weight, based on the HEC, and adjusting the concentration of the organic liquid such that the HEC admixture remains a pourable liquid.

Additionally, the invention comprises a solution which will activate HEC, when admixed therewith, such that the HEC will be at least 80% hydrated within about one hour at 22° C. when added to compatible brines containing one or more salts selected from the group consisting of calcium chloride, calcium bromide, zinc chloride, and zinc bromide, having a density greater than about 13.5 lb./gal., consisting essentially of from about 8.8% to about 66.7% by weight of an amino compound and from about 33.3% to about 91.2% by weight of a water soluble organic liquid, said amino compound containing at least two polar groups per molecule selected from the group consisting of primary amino, secondary amino, tertiary amino, hydroxyl, and mixtures thereof, having a molecular ratio of carbon atoms to the total number of primary amino plus hydroxyl groups not exceeding five. The amino compound preferably has the structural formula:

where R and $R_1$ are independently selected from the group consisting of H, alkyl, $(CH_2)_xZ$, and $[(CH_2)_xNR_2]_yR_2$, each $R_2$ is independnetly either H or $(CH_2)_xZ$, x is an integer from 2 to 6, y is an integer from 1 to 4, and each Z is $NH_2$ or OH, provided that the ratio of carbon atoms to the total number of OH plus $NH_2$ groups does not exceed 5.

The HEC which is useful in this invention is a staple item of commerce manufactured by and obtainable from Hercules, Inc. and Union Carbide Corp. HEC is a water soluble cellulose ether. By ethoxylation of cellulose with ethylene oxide, sufficient hydroxyethyl ether side groups are formed at reactive hydroxyl groups along the cellulose molecular chains to convert the insoluble cellulose into a series of soluble products.

There are three hydroxyl groups in each anhydroglucose unit in the cellulose molecule. "D.S." is the average number of hydroxyl groups substituted in the cellulose per anhydroglucose unit. "M.S." is the average number of moles of reactant combined with the cellulose per anhydroglucose unit. For the alkyl, carboxyalkyl, or acyl derivatives of cellulose the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S/D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

A relatively small amount of ethoxyl substitution renders the HEC product soluble in dilute aqueous alkali (M.S. about 0.3 to 0.5, D.S. about 0.2 to 0.3). For the water-soluble products preferred in the present invention the level of substitution must be higher. The minimum M.S. for water solubility is about 1.0 (D.S. about 0.65); however, the preferred M.S. values fall in the range from about 1.5 to about 3.0 (D.S. values about 0.85 to 1.35), most preferably from about 1.8 to about 2.5. The M.S. and D.S. values are averages per anhydroglucose unit. Hence both highly substituted and completely unsubstituted units can occur in any one molecular chain.

An excellent review of the manufacture, properties, and uses for HEC is presented in the book "Handbook of Water-Soluble Gums and Resins" by Robert L. Davidson, McGraw-Hill, Inc., 1980.

HEC will not hydrate in heavy brines having a density greater than about 13.5 lb./gal. containing at least one soluble salt selected from the group consisting of calcium chloride, calcium bromide, zinc chloride, and zinc bromide, at ambient temperatures. Elevated temperatures and/or very long time periods are necessary to get the HEC to hydrate in such heavy brines which are compatible with the HEC.

The present invention is based on the discovery that certain amines as disclosed herein activate the HEC such that the HEC will hydrate in such heavy brines at ambient temperatures. These amino compounds are so effective that at least 80% of the HEC is hydrated within one hour at ambient temperature after the activated HEC composition is added to a compatible heavy brine. In addition to the amine activator, an organic liquid is necessary to keep the admixture of HEC and amine in a pourable liquid state. If the organic liquid is not present, the admixture of HEC and amine is in either a solid or semi-solid state which is poorly dispersible in aqueous systems. Since the amine drastically increases the rate of hydration of the HEC in compatible heavy brines, the HEC/amine admixture must be readily dispersible in the heavy brine before any appreciable hydration of the HEC occurs. This is accomplished in the present invention by maintaining the HEC and amine admixture as a pourable liquid with a compatible organic liquid which has no appreciable swelling effect on the HEC.

The organic liquids which are useful in the present invention must have no appreciable swelling effect on the HEC. A convenient test to determine useful organic liquids is to admix 1 part by weight of the HEC with 2 parts by weight of the organic liquid in a sealable container, and thereafter allowing the admixture to sit quiescent in the sealed container (to prevent evaporation of the organic liquid) for a period of one week. Organic liquids which are useful in this invention will have free liquid present after one week. Organic liquids which cause the HEC to swell to such an extent that no free liquid is present are not acceptable for use in this invention. Accordingly, the term "organic liquid" is intended to mean, for the purpose of disclosing and claiming the invention herein, an organic liquid which produces a mixture with HEC which has free liquid present after being stored for one week in a sealed container, the mixture containing 2 parts by weight organic liquid for each part by weight of HEC.

The organic liquid which must be present in the activated HEC compositions of this invention can be either water soluble or water insoluble. It has been determined that the chemical characteristics of the amine activators of this invention are dependent upon which type (i.e. water soluble or water insoluble) of organic liquid is used in the compositions.

The amine activators which are useful in the activated HEC compositions of this invention which contain a water soluble organic liquid are amino compounds containing at least two groups per molecule selected from the group consisting of primary amino, secondary amino, tertiary amino, hydroxyl, and mixtures thereof, having an atomic ratio of carbon to the total number of primary amino plus hydroxyl groups not exceeding five. Preferred amino compounds are represented by the structural formula:

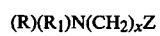

where R and $R_1$ are independently selected from the group consisting of hydrogen, alkyl, $(CH_2)_xZ$, and $[(CH_2)_xNR_2]_yR_2$, each $R_2$ is independently either H or $(CH_2)_xZ$, x is an integer from 2 to 6, y is an integer from 1 to 4, and each Z is $NH_2$ or OH, provided that the ratio of carbon atoms to the total number of $NH_2$ plus OH groups is less than or equal to 5. Preferably x is 2 or 3.

The amine activators which are useful in the activated HEC compositions of this invention which contain a water insoluble organic liquid are amino compounds containing at least two polar groups per molecule selected from the group consisting of primary amino, secondary amino, tertiary amino, hydroxyl, and mixtures thereof, haing an equivalent weight per amino group in the range from about 35 to about 150, an atomic ratio of carbon to the total number of polar groups in the range from 1.5 to 5, and an atomic ratio of carbon to the total number of primary amino plus hydroxyl groups in the range from 2 to 5. Preferred amino compounds are represented by the structural formula:

where R and $R_1$ are independently selected from the group consisting of hydrogen, alkyl, $(CH_2)_xZ$, and $[(CH_2)_xNR_2]_yR_2$, each $R_2$ is independently either H or $(CH_2)_xZ$, x is an integer from 2 to 6, y is an integer from 1 to 4, and each Z is $NH_2$ or OH, provided that the ratio of the number of carbon atoms to the total number of amino groups plus hydroxyl groups is in the range from 1.5 to 5, the ratio of the number of carbon atoms to the total number of $NH_2$ plus OH groups is in the range from 2 to 5, and the equivalent weight per amino group is in the range from about 35 to about 150. Preferably x is 2 or 3, the equivalent weight per amino group is from about 35 to about 120, and the ratio of the number of carbon atoms to the total number of $NH_2$ plus OH groups is greater than 2 and does not exceed 5.

The processes of this invention for activating HEC for use in heavy brines, and for preparing the activated HEC compositions of this invention, require that the HEC be admixed with the organic liquid before admixing the HEC with the amino compound. Alternatively, the HEC can be admixed with a solution or mixture of the amino compound and the organic liquid. In this manner there is produced a pourable, liquid activated HEC composition which readily disperses and hydrates in compatible heavy brines. If the amino compound and the HEC are admixed first before adding the organic liquid, the HEC swells rapidly producing a solid or semi-solid mass that is thereafter extremely difficult to disperse in the organic liquid.

Suspensions of HEC in an organic liquid, such as those discussed hereinbefore, can be activated by adding to the suspension the amino compound as disclosed herein. Depending on the concentration of HEC in the suspension, additional organic liquid may have to be added to keep the activated HEC composition in a pourable, liquid state.

The minimum concentration of the amino compound activator is that amount which will activate the HEC to the extent that at least 80% of the HEC will be hydrated within about one hour at 22° C. when the activated HEC composition is added to a compatible heavy brine having a density greater than about 13.5 lb./gal. containing one or more salts selected from the group consisting of calcium chloride, calcium bromide, zinc chloride, and zinc bromide. Generally, the concentration of the amino compound activator must be such as to provide at least 40% by weight, based on the weight of HEC, preferably at least 50%. The concentration of the organic liquid must be such as to provide an activated HEC composition which is a pourable liquid at ambient temperatures. Generally, the concentration of HEC in the activated HEC composition will be in the range from about 20% to about 35% by weight of the composition when the organic liquid is water insoluble, and in the range from about 15% to about 30% by weight of the composition when the organic liquid is water soluble. If additional materials are added to the activated compositions, such as sized calcium carbonate or sized salt bridging additives, and the like, the concentration of HEC in the composition is reduced accordingly due to the viscosity increase imparted by these solid materials.

Water has a powerful swelling effect on the water soluble HEC used in the present invention. Thus if water is present in the activated HEC compositions of this invention, one or more of the following will have to be undertaken to compensate for the swelling effect of the water on the HEC: (a) additional organic liquid can be added; or (b) the concentration of the amine activator can be decreased. If step (b) is taken, the combined concentrations of amino compound and water must activate the HEC to the extent required of this invention; i.e., at least 80% of the HEC will be hydrated within about one hour at 22° C. when the activated HEC composition is added to a compatible heavy brine having a density greater than about 13.5 lb./gal. containing one or more salts selected from the group consisting of calcium chloride, calcium bromide, zinc chloride, and zinc bromide. Generally the activated HEC compositions of this invention should not contain greater than 300% water, based on the weight of amine activator, preferably not greater than 100%, when the organic liquid is water soluble. When the organic liquid is insoluble in water, generally the activated HEC compositions should contain no greater than 33% water, based on the weight of amine activator, preferably less than about 20% water.

HEC is added to a heavy brine of the types disclosed herein to increase the viscosity and decrease the loss of fluid from the brine to the subterranean formations contacted by the brine. Generally only a small volume of the brine is treated with HEC, i.e., a so-called "pill" is prepared containing the HEC and this pill (usually from 20 to 100 barrels (42 gallons/bbl.) total volume) is placed in a borehole containing the heavy brine at the location where excessive fluid loss is occurring.

When the activated HEC compositions of this invention are added to a compatible heavy brine having a density greater than about 13.5 lb./gal. containing one or more salts selected from the group consisting of calcium chloride, calcium bromide, zinc chloride, and zinc bromide, the HEC disperses and hydrates to increase the viscosity of the brine. The viscosity development is initially slow but rapidly increases such that the HEC is at least 80% hydrated within about one hour at a temperature of 22° C. or greater.

The API RP 13B apparent viscosity of a dispersion of HEC in a compatible heavy brine having a density greater than about 13.5 lb./gal. containing one or more salts selected from the group consisting of calcium chloride, calcium bromide, zinc chloride, and zinc bromide, after one hour at 22° C. is compared to the viscosity of the dispersion after aging for at least 16 hours at 22° C. to determine the percent hydration of HEC for the purposes of disclosing and claiming the invention herein. Preferably the HEC concentration in the dispersion is 1.5 lb./bbl. as this concentration provides sufficient viscosity in all compatible heavy brines for observable differences in the rate of hydration of the HEC, yet this concentration of HEC does not provide a viscosity which is beyond the capacity of the rheometer to measure. Preferably the dispersion is agitated during the initial one hour aging period although agitation is not required after the first few minutes as the activated HEC compositions readily disperse and hydrate under these conditions such that lumps of hydrated HEC do not form.

The use of the term "compatible" in connection with the heavy brines as disclosed and claimed herein is intended to mean that the HEC will hydrate in and viscosify the brine after subjecting the brine, containing the HEC, to an elevated temperature of 150° F. under continuous agitation, such as in an oven adapted to roll the brine in a suitably capped container, for 16 hours. Brines in which the HEC will not disperse and uniformly hydrate under these conditions are not compatible with HEC; hence, the HEC cannot be hydrated in such brines under any known conditions.

The following specific examples illustrate the processes and compositions of this invention in comparison with compositions and processes outside the scope of this invention. The examples are presented by way of illustration of the invention and are not intended to limit the invention, the invention being limited only by the disclosure herein and the appended claims.

EXAMPLE 1

A variety of amino compounds were evaluated as activators of HEC as follows:

A.

1. 4.5 parts of the amino compound were mixed with 3.5 parts of diesel oil and added to 10 parts of a diesel oil suspension of HEC containing 45% HEC, 2.5% dimethyl dihydrogenatedtallow ammonium bentonite, 1.0% of a mixture containing 95% methanol and 5% water, 1.5% of octyl phenol ethoxylated with 7–8 moles of ethylene oxide per mole of phenol, and 50% diesel oil.

2. The HEC suspensions, which now contained 25% HEC and 25% amino compound, were evaluated at a concentration of 1.5 ppb. HEC in a 16.0 ppg. $ZnBr_2/CaBr_2$ brine.

3. The HEC suspension and brine were mixed and periodically shaken for one hour before obtaining the API rheological properties.

4. The brines were then aged for 16 hours at 72° F. and the rheology again determined.

B.

1. 10 parts of HEC were mixed with 30 parts of isopropyl alcohol followed by 10 parts of amino compound.

2. The HEC compositions were aged at 72° F. for 16 hours and thereafter evaluated as in A above.

The data obtained are given in Tables 1A and 1B. Characteristics of the amino compounds are given in Table 1C.

The data obtained indicate that activators for HEC suspended in a water insoluble organic liquid such as diesel oil must have the following characteristics: An equivalent weight per amino group in the range from about 35 to about 150, a ratio of carbon atoms to the total number of nitrogen atoms and hydroxyl groups in the range from about 1.5 to 5, and a ratio of carbon atoms to the total number of primary amino groups ($NH_2$) and hydroxyl groups in the range from about 2 to about 5. Activators for HEC suspended in a water soluble organic solvent which does not appreciably swell the HEC, such as IPA, must have an atomic ratio of carbon atoms to the total number of primary amino groups and hydroxyl groups not exceeding five. Certain of the amines such as JEFFAMINE D-230 and JEFFAMINE T-403 depressed the ultimate viscosity of the HEC/heavy brine dispersions or exhibit an activation time at 22° C. greater than 16 hours, either of which are undesirable.

TABLE 1A

I. Evaluation of Amino Compounds in Diesel Oil
1.5 ppb HEC in a 16.0 ppg $ZnBr_2/CaBr_2$ Brine

| Amino Compound | API Apparent Viscosity | |
|---|---|---|
| | 1 Hour @ 72° F. | 16 Hours @ 72° F. |
| UCAR 310 | 100.5 | 106.5 |
| ACCELERATOR 399 | 101 | 104.5 |
| Dimethyl amino propylamine | 105 | 105 |
| Methyl diethanolamine | 110 | 114 |
| Imino bispropylamine | 91 | 101 |
| Tetraethylene pentamine | 89 | 104 |
| Triethylene tetramine | 80 | 95 |
| Polyglycolamine H 221 | 82 | 95 |
| JEFFAMINE D-230 | 72 | 79 |
| JEFFAMINE T-403 | 63 | 75 |
| Aminoethyl piperazine | 30 | * |
| Diethylene triamine | 35 | 80 |
| Propane diamine | 25 | * |
| Polyamine HPA No. 2 | 35 | — |
| 2-Amino-2-ethyl-1, 3-propanediol | * | * |
| 2-Amino-2-methyl-1-propanol | * | * |
| Aminoethyl ethanolamine | 45 | 98 |
| Monoethanolamine | 32 | * |
| Diethyl ethanolamine | 17 | * |
| None | 10.5 | 15.5 |

*Hydrated lumps of HEC

TABLE 1B

II. Evaluation of Amino Compounds in IPA
1.5 ppb HEC in a 16.0 ppg $ZnBr_2/CaBr_2$ Brine

| Amino Compound | API Apparent Viscosity | |
|---|---|---|
| | 1 Hour @ 72° F. | 16 Hours @ 72° F. |
| UCAR 310 | 107 | 112.5 |
| JEFFAMINE D-230 | 50 | 76.5 |
| Diethylene triamine | 93.5 | 102.5 |
| 2-Amino-2-cthyl-1, 3-propanediol | 98.5 | 102 |
| 2-Amino-2-methyl-1-propanol | 107 | 114 |
| Amino ethyl ethanolamine | 98 | 101.5 |
| Mono ethanolamine | 92.5 | 105 |
| Diethyl ethanolamine | 23 | 52 |
| Diethanolamine | 87 | 104.5 |
| Polyglycolamine H-163 | 86 | 100 |

TABLE 1C

Amino Compounds Evaluated As Activators For HEC

| Amino Compound | Equiv. Weight | Ratio of Carbon Atoms to | |
|---|---|---|---|
| | | $NH_2$ OH | Total N OH |
| Dimethyl amino propylamine | 58.5 | 5 | 2.5 |
| Methyl diethanolamine | 119 | 2.5 | 1.67 |
| Imino bispropylamine | 44 | 3 | 2 |
| Tetraethylene pentamine | 38 | 4 | 1.6 |
| Triethylene tetramine | 36.5 | 3 | 1.5 |
| Polyglycolamine H221 | 110 | 5 | 5 |
| JEFFAMINE D-230 | 118 | 7 | 7 |
| JEFFAMINE T-403 | 113 | 8 | 8 |
| Aminoethyl piperazine | 43 | 6 | 2 |
| Diethylene triamine | 34 | 2 | 1.33 |
| Propane diamine | 30 | 1.5 | 1.5 |
| Polyamine HPA No. 2 | 38 | 5 | 1.6 |
| 2-Amino-2-ethyl-1, 3-propanediol | 119 | 1.67 | 1.67 |
| 2-Amino-2-methyl-1-propanol | 89 | 2 | 2 |
| Aminoethyl ethanolamine | 52.5 | 2 | 1.33 |
| Monoethanol amine | 62 | 1 | 1 |
| Diethyl ethanolamine | 117 | 6 | 3 |
| UCAR 310 | Unknown | | |
| ACCELERATOR 399 | Unknown | | |

EXAMPLE 2

An activated HEC suspension (Sample 2a) was prepared by mixing together 25% HEC-25, 2.5% dimethyl dihydrogenatedtallow ammonium bentonite, 1.0% methanol containing 5% water, 1.5% octyl phenol ethoxylated with 7–8 moles/mole of ethylene oxide, 12.5% UCAR 310, and 57.5% diesel oil in a Waring Blendor for five minutes. Another activated HEC suspension (Sample 2b) was prepared identically except that the sample contained 3.0% of the organoclay and 57% diesel oil. These samples were evaluated for viscosity development at a concentration of 1.5 ppb. HEC in a 16.0 ppg. $ZnBr_2/CaBr_2$ brine initially and after 4 weeks aging at 140° F. The data obtained are given in Table 2.

The data illustrate the excellent hydration rate and temperature stability of the activated HEC suspensions of this invention.

TABLE 2

| Hydration Time of Polymer In Brine, Mins. | Sample 2a/Sample 2b 1.5 ppb HEC in 16.0 ppg Brine API Apparent Viscosity | |
|---|---|---|
| | Initial | 4 Weeks @ 140° F. |
| 5 | — | 27/22.5 |
| 10 | 41.5/40 | 34.5/32 |
| 15 | — | 47.5/46 |
| 20 | 72/62.5 | 59.5/5.75 |
| 30 | 90/84 | 81/79.5 |
| 40 | 99/91 | — |
| 45 | — | 98.5/95 |
| 50 | 101/96 | — |
| 60 | 105/97 | 107/103 |
| 960 | 116/112 | 110.5/112.5 |

EXAMPLE 3

Various concentrations of UCAR 310 activator were evaluated as in Example 1A. The data obtained are given in Table 3.

The data indicate that the minimum concentration of activator required for good hydration of the HEC is at least about 40%, based on the weight of HEC.

TABLE 3

| Concentration of UCAR 310* | 1.5 ppb HEC, 16.0 ppg ZnBr$_2$/CaBr$_2$ Brine API Rheology | | | | | | | |
|---|---|---|---|---|---|---|---|---|
| | 1 Hour @ 72° F. | | | | 960 Hours @ 72° F. | | | |
| | AV | PV | YP | 10-Sec. Gel | AV | PV | YP | 10-Sec. Gel |
| 35 | 50.5 | 35 | 31 | 3 | 78.5 | 48 | 61 | 11 |
| 50 | 95 | 55 | 80 | 16 | 109.5 | 58 | 103 | 26 |
| 65 | 101.5 | 57 | 87 | 20 | 111.5 | 60 | 103 | 26 |
| 100 | 100.5 | 57 | 87 | 20 | 106.5 | 59 | 95 | 24 |
| 200 | 87 | 53 | 68 | 14 | 96 | 55 | 82 | 19 |

*Based on the weight of HEC

A further embodiment of this invention provides a process for increasing the viscosity of a heavy brine containing at least one salt selected from the group consisting of calcium chloride, calcium bromide, zinc chloride, and zinc bromide, having a density greater than about 13.5 pounds per gallon, at ambient temperatures, which comprises adding to said brine a viscosifying amount of an activated HEC composition obtained by the processes of this invention disclosed herein. Preferably there is added sufficient of the activated HEC composition of this invention to provide from about 0.5 to about 6 pounds of HEC per 42 gallon barrel of brine, most preferably from about 0.75 lb./bbl. to about 5 16/bbl.

I claim:

1. A process for activating hydroxyethyl cellulose (HEC) such that said HEC will be at least 80% hydrated within about one hour at 22° C. when added to a compatible brine having a density greater than about 13.5 lb./gal. containing one or more salts selected from the group consisting of calcium chloride, calcium bromide, zinc chloride, and zinc bromide, which comprises admixing with said HEC a solution of an amino compound in a water soluble organic liquid in an amount sufficient to provide at least 40% of said amino compound, based on the weight of HEC, and from about 15% to about 30% by weight of HEC in the mixture, said amino compound containing at least two polar groups per molecule selected from the group consisting of primary amino, secondary amino, tertiary amino, hydroxyl and mixtures thereof, having an atomic ratio of carbon atoms to the total number of primary amino plus hydroxyl groups not exceeding five.

2. The process of claim 1 wherein said amino compound has the structural formula:

$$(R)(R_1)N(CH_2)_xZ$$

where R and R$_1$ are independently selected from the group consisting of H, alkyl, (CH$_2$)$_x$Z, and [(CH$_2$)$_x$NR$_2$]$_y$R$_2$, each R$_2$ is independently either H or (CH$_2$)$_x$Z, x is an integer from 2 to 6, y is an integer from 1 to 4, and each Z is NH$_2$ or OH, provided that the ratio of carbon atoms to the total number of OH plus NH$_2$ groups is $\leq 5$.

3. The process of claim 2 wherein said solution contains from about 8.8% to about 66.7% of said amino compound and from about 33.3% to about 91.2% of said water soluble liquid.

4. The process of claim 1, 2, or 3 wherein said water soluble organic liquid is isopropanol.

5. The process of claim 1, 2, or 3 wherein x is 2 or 3.

6. A process for activating hydroxyethyl cellulose (HEC) such that said HEC will be at least 80% hydrated within about one hour at 22° C. when added to a compatible brine having a density greater than about 13.5 lb./gal. containing one or more salts selected from the group consisting of calcium chloride, calcium bromide, zinc chloride, and zinc bromide, which comprises admixing said HEC with a water soluble organic liquid and thereafter mixing therewith an amino compound containing at least two polar groups per molecule selected from the group consisting of primary amino, secondary amino, tertiary amino, hydroxyl, and mixtures thereof, having an atomic ratio of carbon atoms to the total number of primary amino plus hydroxyl groups not exceeding five, wherein the amount of said amino compound is at least 40% by weight, based on said HEC, and the amount of said water soluble organic liquid is sufficient to keep the HEC admixture a pourable liquid.

7. The process of claim 6 wherein said amino compound has the structural formula:

$$(R)(R_1)N(CH_2)_xZ$$

where R and R$_1$ are independently selected from the group consisting of H, alkyl, (CH$_2$)$_x$Z, and [(CH$_2$)$_x$NR$_2$]$_y$R$_2$, each R$_2$ is independently either H or (CH$_2$)$_x$Z, x is an integer from 2 to 6, y is an integer from 1 to 4, and each Z is NH$_2$ or OH, provided that the ratio of carbon atoms to the total number of OH plus NH$_2$ groups is $\leq 5$.

8. The process of claim 6 or 7 wherein said water soluble organic liquid is isopropanol.

9. The activated hydroxyethyl cellulose mixture obtained by the process of claim 1, 2, 3, 6 or 7.

10. A process for activating hydroxyethyl cellulose (HEC) such that said HEC will be at least 80% hydrated within about one hour at 22° C. when added to a compatible brine containing one or more salts selected from the group consisting of calcium chloride, calcium bromide, zinc chloride, and zinc bromide, and having a density greater than about 13.5 lb./gal., which comprises admixing said HEC with a water soluble organic liquid and thereafter mixing therewith an amino compound containing at least two polar groups per molecule selected from the group consisting of primary amino, secondary amino, tertiary amino, hydroxyl, and mixtures thereof, having an equivalent weight per amino group in the range from about 35 to about 150, an atomic ratio of carbon atoms to said polar groups in the range from 1.5 to 5, and an atomic ratio of carbon atoms to the total number of primary amino and hydroxyl groups in the range from 2 to 5, wherein the amount of said amino compound is at least 40% by weight, based on said HEC, and the amount of said organic liquid is sufficient to provide from about 20% to about 35% by weight HEC in the final mixture.

11. The process of claim 10 wherein said amino compound is from about 40% to about 200% by weight, based on the weight of HEC.

12. The process of claim 11 wherein the equivalent weight per amino group is in the range from about 35 to about 120, and wherein the ratio of carbon atoms to the total number of primary amino and hydroxyl groups is greater than 2 and does not exceed 5.

13. The process of claim 10, 11, or 12 wherein said organic liquid is a hydrocarbon.

14. A process for activating a suspension of hydroxyethyl cellulose (HEC) in a water insoluble oleaginous liquid such that said HEC will be at least 80% hydrated within about one hour at 22° C. when added to compatible brines containing one or more salts selected from the group consisting of calcium chloride, calcium bromide, zinc chloride, and zinc bromide having a density greater than about 13.5 lb./gal., which comprises admixing with said suspension an amino compound containing at least two polar groups per molecule selected from the group consisting of primary amino, secondary amino, tertiary amino, hydroxyl, and mixtures thereof, having an equivalent weight per amino group in the range from about 35 to about 150, an atomic ratio of carbon atoms to said polar groups in the range from 1.5 to 5, and an atomic ratio of carbon atoms to the total number of primary amino and hydroxyl groups in the range from 2 to 5, wherein the amount of said amino compound is at least 40% by weight, based on said HEC, and adjusting the concentration of said oleaginous liquid such that the concentration of said HEC in the final mixture is from about 20% to about 35% by weight.

15. The process of claim 14 wherein said amino compound is from about 40% to about 200% by weight, based on the weight of HEC.

16. The process of claim 15 wherein the equivalent weight per amino group is in the range from about 35 to about 120, and wherein the ratio of carbon atoms to the total number of primary amino and hydroxyl groups is greater than 2 and does not exceed 5.

17. The process of claim 14, 15 or 16 wherein said oleaginous liquid is a hydrocarbon.

18. The activated hydroxyethyl cellulose mixture obtained by the process of claim 10, 11, 12, 14, 15 or 16.

19. A process of increasing the viscosity of a heavy brine having a density greater than about 13.5 pounds per gallon containing one or more salts selected from the group consisting of calcium chloride, calcium bromide, zinc chloride, and zinc bromide, which comprises adding to said brine a viscosifying amount of an activated hydroxyethyl cellulose composition obtained from the process of claim 1, 2, 3, 6, 7, 10, 11, 12, 14, 15 or 16.

* * * * *